Patented Sept. 4, 1951

2,566,535

UNITED STATES PATENT OFFICE 2,566,535

QUATERNARY AMMONIUM SALTS OF TERTIARY-AMINOALKYL SUBSTITUTED PHENYLACETONITRILES

Arlo Wayne Ruddy, Albany, N. Y., assignor to Sterling Drug Inc., New York, N. Y., a corporation of Delaware No Drawing. Application January 27, 1949, Serial No. 73,230

15 Claims. (Cl. 260—293)

This invention relates to quaternary ammonium salts of the general formula

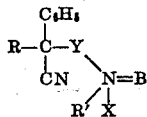

wherein R is an alkyl or alkenyl radical of 4–6 carbon atoms or a 5–6 membered cycloalkyl radical, R' is an alkyl radical of 1–6 carbon atoms or a lower aralkyl radical, such as benzyl, which can bear inert nuclear substitutents such as halo, alkoxy or lower alkyl; Y is an ethylene radical which may be substituted by alkyl groups, —N=B is a dialkylamino, piperidino, pyrrolidino and morpholino group, and X is a non-toxic anion.

These new compounds are useful as antispasmodic agents.

These quaternary ammonium salts are prepared by reacting alkyl or aralkyl esters of inorganic acids or certain strong organic acids such as sulfonic acids of the formula R'X with a nitrile of the formula

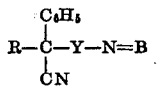

where R, Y and —N=B have the meanings given hereinabove. Such salt-forming substances of the formula R'X include methyl chloride, methyl bromide, methyl iodide, ethyl chloride, ethyl bromide, ethyl iodide, propyl chloride, propyl bromide, propyl iodide, isopropyl bromide, butyl chloride, butyl bromide, isobutyl bromide, sec.-butyl bromide, n-amyl bromide, n-hexyl chloride, benzyl chloride, benzyl bromide, methyl sulfate, ethyl sulfate, methyl benzenesulfonate, methyl p-toluenesulfonate, etc., which will react directly with any nitrile of the above formula to give respectively the methochloride, methobromide, methiodide, ethochloride, ethobromide, ethiodide, propochloride, propobromide, propiodide, isopropobromide, butochloride, butobromide, isobutobromide, sec.-butobromide, n-amobromide, n-hexochloride, benzochloride, benzobromide, methosulfate, ethosulfate, methobenzenesulfonate, metho-p-toluenesulfonate, etc.

The quaternary ammonium salts are generally prepared by warming the free base with an excess of the salt-forming ester, R'X, in an inert organic medium such as benzene or ether. The quaternary ammonium salt will separate, usually as a crystalline product, or can be made to precipitate by the addition of other solvents or by concentration of the solution.

Alternatively, it is possible by use of metathetical reactions to replace the anion of a quaternary by a different anion without reconversion to the free base. This is usually effected by treatment of a solution of the quaternary, QX, with silver oxide (hydroxide). The silver salt, AgX, is precipitated leaving in solution the quaternary hydroxide, QOH. It is prerequisite, of course, that the salt AgX be insoluble in water. The quaternary hydroxide may then be neutralized with the appropriate acid to give any desired salt. For example, methiodides are generally easier to prepare by direct addition than methochlorides. Methyl iodide reacts more readily and is more convenient to use than methyl chloride. However, the methochloride may be readily prepared from the methiodide by the method just described. Treatment of a solution of the methiodide with silver oxide precipitates silver iodide leaving a solution of the quaternary hydroxide. Neutralization of this solution with hydrochloric acid gives the methochloride which can be obtained by concentration of the solution.

The intermediate nitriles are prepared by effecting successive alkylations of phenylacetonitrile (benzyl cyanide). Alkylation of phenylacetonitrile with a cycloalkyl, alkyl, or alkenyl halide in the presence of a strong metalating agent such as sodium amide or sodium hydride gives a compound of the formula (C6H5)RCHCN. This may be further alkylated with a tertiary-aminoalkyl halide to give (C6H5)RC(CN)—Y—N=B.

There is no need for the alkylations to take place in the order given, although it is preferred to introduce the aminoalkyl group last, since possible side reactions are thereby minimized. For example, phenylacetonitrile is condensed with isobutyl bromide, in the presence of sodium amide to give phenylisobutylacetonitrile. The latter, when condensed with N-piperidylethyl chloride under similar conditions gives phenylisobutyl-(N-piperidylethyl)-acetonitrile.

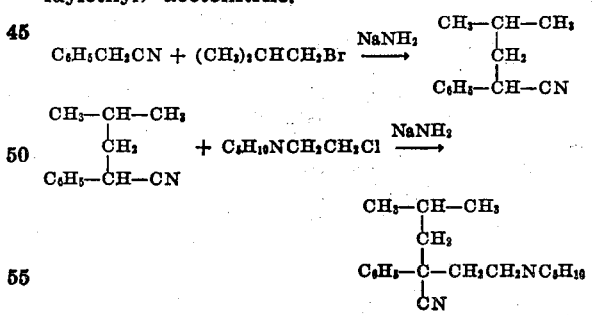

Examples of organic halides which may be used to introduce the group R into the alpha-position of phenylacetonitrile include n-butyl halide, iso-butyl halide, sec.-butyl halide, tert.-butyl halide, n-amyl halide, isoamyl halide, active-amyl halide, n-hexyl halide, isohexyl halide, 2-methylpentyl halide, methallyl halide, 2-butenyl halide, 3-butenyl halide, 2-pentenyl halide, 3-pentenyl halide, 2-hexenyl halide, 3-hexenyl halide, cyclopentyl halide, cyclohexyl halide, etc. The halogen atoms may be chlorine, bromine or iodine.

When it is desired to introduce an alkenyl group which has a double bond in the vinyl position with respect to the alpha-carbon of the substituted acetonitrile, a variation in synthesis must be employed because of the unreactivity of vinyl and substituted vinyl halides. This can be accomplished, however, by condensation of phenylacetonitrile with an aldehyde or ketone by the general method of Murray and Cloke, J. Am. Chem. Soc. 58, 2016 (1936) to give an alkylidene-phenylacetonitrile. This may be alkylated in the usual way with a tertiary-aminoalkyl halide, the double bond then shifting into the vinyl position. For example, condensation of isobutyraldehyde with phenylacetonitrile gives isobutylidenephenylacetonitrile, which in turn can be alkylated with beta-(N-piperidylethyl)-chloride.

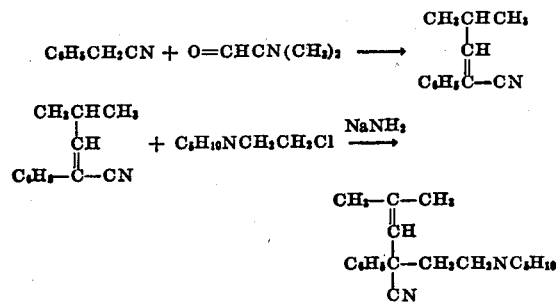

The alpha-substituent of the substituted phenylacetonitrile, —Y—N=B, is introduced by alkylation using the halide, Hal—Y—N=B. Y represents a two-carbon chain which may bear alkyl substituents, such as one or more methyl or ethyl radicals, on either or both carbon atoms of the chain. It includes alkylene chains of the type

where X represents hydrogen or lower alkyl radicals. Such alkylene radicals having the free valence bonds only on adjacent carbon atoms may be termed alpha, beta-alkylene radicals, alpha indicating one of the carbon atoms in the above formula and beta indicating the adjacent carbon atom. The term "alpha,beta" distinguishes alkylene radicals of the above type from those in which the free valence bonds are not on adjacent carbon atoms of the radicals. The grouping —N=B represents a tertiary-amino radical which may be dialkylamino, the two alkyl groups being the same or different, or a saturated 5-6 membered heterocyclic radical such as piperidyl, pyrrolidyl, morpholinyl or thiomorpholinyl.

Examples of the compounds Hal—Y—N=B which may be used for alkylation of the substituted phenylacetonitriles include beta-dimethylaminoethyl chloride, beta-ethylmethylaminoethyl chloride, beta-diethylaminoethyl bromide, alpha - methyl - beta - diethylaminoethyl chloride, beta-dipropylaminoethyl iodide, beta-dibutyl-aminoethyl chloride, beta - (N - piperidyl) ethyl chloride, beta-(N-pyrrolidyl) ethyl chloride, beta-(N-morpholinyl) ethyl chloride, etc.

When used, for example, to alkylate isobutyl-phenylacetonitrile, the above named aminoalkyl halides give the following nitriles respectively: isobutyl-beta-dimethylaminoethyl - phenylacetonitrile, isobutyl - beta - ethylmethylaminoethyl-phenylacetonitrile, isobutyl-beta-diethylaminoethyl-phenylacetonitrile, isobutyl-(alpha-methyl-beta - diethylamino)ethyl - phenylacetonitrile, isobutyl-beta-dipropylaminoethyl - phenylacetonitrile, isobutyl-beta-dibutylaminoethyl-phenylacetonitrile, isobutyl - beta-(N - piperidyl)ethyl-phenylacetonitrile, isobutyl-beta-(N-pyrrolidyl) - ethyl-phenylacetonitrile, and isobutyl-(N-morpholinyl) ethyl-phenylacetonitrile.

The quaternary ammonium salts of my invention are prepared by addition of alkyl or aralkyl esters, described earlier, to the basic nitriles. The nitriles named in the preceding paragraph may be employed, for example, as follows: isobutyl-beta-dimethylaminoethyl - phenylacetonitrile reacts with methyl chloride to give (3-cyano-3-phenyl-3-isobutyl) propyl-trimethylammonium chloride; isobutyl-beta - ethylmethylaminoethyl-phenylacetonitrile reacts with methyl bromide to give (3-cyano-3-phenyl-3-isobutyl) propyl-ethyl-dimethylammonium bromide; isobutyl-beta-diethylaminoethyl-phenylacetonitrile reacts with methyl iodide to give (3-cyano-3-phenyl-3-isobutyl) propyl-diethyl - methylammonium iodide; isobutyl -(alpha-methyl-beta-diethylamino) propyl-phenylacetonitrile reacts with ethyl bromide to give (1,2-dimethyl-3-cyano-3-phenyl-3-isobutyl) propyl-triethylammonium bromide; isobutyl-beta-dipropylaminoethyl - phenylacetonitrile reacts with propyl bromide to give (3-cyano-3-phenyl - 3 - isobutyl) propyl-tripropylammonium bromide; isobutyl-beta-dibutylaminoethyl-phenylacetonitrile reacts with n-hexyl bromide to give (3-cyano-3-phenyl-3-isobutyl) propyl-dibutyl-n-hexylammonium bromide; isobutyl-beta-(N-piperidyl) propyl - phenylacetonitrile reacts with benzyl chloride to give N-(1-methyl-3-cyano-3-phenyl - 3 - isobutyl) propyl - benzylpiperidinium chloride; isobutyl - beta - (N - pyrrolidyl) ethyl-phenylacetonitrile reacts with p-methylbenzyl bromide to give N-(3-cyano-3-phenyl-3-isobutyl) propyl - p - methylbenzylpyrrolidinium bromide; and isobutyl-(N-morpholinyl) ethyl-phenylacetonitrile reacts with methyl iodide to give N-(3-cyano-3-phenyl-3-isobutyl) propyl-methyl-morpholinium iodide.

The following examples will illustrate my invention more completely but should not be construed as a limitation thereto.

EXAMPLE 1

(a) *Phenylisobutylacetonitrile.*—Benzyl cyanide (293 g.) was added gradually to a stirred suspension of 115 g. of sodium amide in 250 cc. of dry benzene at 40–50° C. The mixture was stirred at 50° C. for one and one-half hours, cooled to 25° C., and 343 g. of isobutyl bromide was added. After heating for an additional two hours at 65° C., the mixture was cooled and the excess sodium amide was hydrolized by addition of alcohol and water. The organic layer was separated and washed with dilute hydrochloric acid and water and dried over anhydrous sodium sulfate. The product was then fractionated and refractionated through a heated column, packed with glass helices, and the product, B. P. 80–90° C. (0.5 mm.), $n_D^{25}$=1.4978–85, was collected.

(b) *Phenylisobutyl - (N-piperidylethyl)-acetonitrile.*

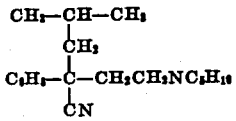

A stirred suspension of 18 g. of sodium amide in a solution of 26 g. of phenylisobutylacetonitrile in 200 cc. of dry benzene was heated to 65° C. for a few minutes. The mixture was then cooled to about 30° C., and 27.6 g. of N-piperidylethyl chloride hydrochloride was added. After refluxing for two hours, the mixture was cooled and the excess sodium amide was hydrolyzed by addition of alcohol and water. The organic layer was separated and washed with water and dried over anhydrous sodium sulfate. The product was distilled at reduced pressure giving 34 g. (80%) of phenylisobutyl - (N - piperidylethyl) - acetonitrile, B. P. 136–142° (0.04 mm.), $n_D^{25}$=1.5140.

Its hydrochloride had the M. P. 193–195° C. (dec.)

Anal. calcd. for $C_{19}H_{29}N_2Cl$: C, 71.11; H, 9.11; N, 8.73. Found: C, 71.16; H, 9.00; N, 8.65.

(c) *N - (3-cyano-3-phenyl-3-isobutyl)propyl-methylpiperidinium iodide*

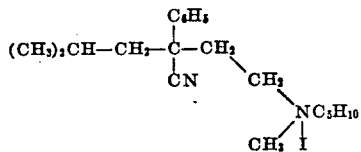

was prepared by heating phenylisobutyl-(N-piperidylethyl)-acetonitrile with an excess of methyl iodide in benzene solution. The desired compound crystallized upon cooling and was collected by filtration and recrystallized from ethyl acetate. It had the M. P. 171–173° C.

Anal. calcd. for $C_{20}H_{31}N_2I$: C, 56.33; H, 7.33; I, 29.77. Found: C, 56.55; H, 7.33; I, 29.62.

EXAMPLE 2

(a) *Phenylcyclohexyldiethylaminoethylacetonitrile.*

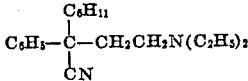

A stirred suspension of 48.4 g. of sodium amide in a solution of 207.3 g. of phenycyclohexylacetonitrile (Organic Syntheses 25, 25) in 200 cc. of dry benzene, was heated to 65° C. for a few minutes. The mixture was then cooled to about 30° C. and 144.4 g. of N-diethylaminoethyl chloride was added. After refluxing for two hours, the mixture was cooled and the excess sodium amide was hydrolyzed by addition of alcohol and water. The organic layer was separated and washed with water and dried over anhydrous sodium sulfate. The product was distilled at reduced pressure giving 256 g. of phenylcyclohexyldiethylaminoethylacetonitrile, B. P. 174–182° C. (2 mm.); $n_D^{25}$=1.5187.

Its hydrochloride had the M. P. 157–158° C. Anal. calcd. for $C_{20}H_{31}N_2Cl$: N, 8.37; Cl. 10.59. Found: N, 8.36; Cl, 10.60.

(b) *(3-cyano-3-phenyl-3-cyclohexyl)propyldiethyl-methylammonium iodide*

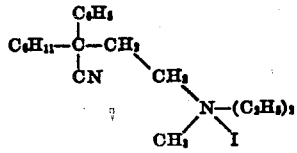

was prepared by heating phenylcyclohexyldiethylaminoethylacetonitrile with an excess of methyl iodide in benzene solution. It had the M. P. 169–170° C.

Anal. calcd. for $C_{21}H_{33}N_2I$: C, 57.26; H, 7.55; N, 6.36; I, 28.82. Found: C, 57.09; H, 7.34; N, 6.22; I. 28.35.

EXAMPLE 3

(a) *Phenylisobutyldiethylaminoethylacetonitrile*

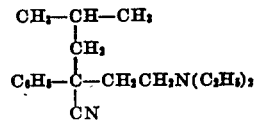

was prepared by a method similar to that described in Example 2, part (a). The reaction of 86.7 g. of phenylisobutylacetonitrile (Example 1, part a), 65 g. of diethylaminoethyl chloride and 50 g. of sodium amide gave 110 g. of phenylisobutyldiethylaminoethylacetonitrile, B. P. 114–118° C. (0.05 mm.), $n_D^{25}$=1.4960.

Its hydrochloride had the M. P. 133–134° C.

Anal. calcd. for $C_{18}H_{29}N_2Cl$: N, 9.07; Cl, 11.48. Found: N, 9.09; Cl, 11.42.

(b) *(3 - cyano - 3 - phenyl - 3 - isobutyl)propyldiethyl-methylammonium iodide*

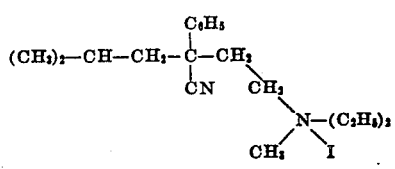

was prepared by heating phenylisobutyldiethylaminoethylacetonitrile with an excess of methyl iodide in benzene solution. It had the M. P. 155.5–157° C.

Anal. calcd. for $C_{19}H_{31}N_2I$: N, 6.76; I, 30.63 Found: N, 6.72; I, 30.60.

(c) *(3 - cyano - 3 - phenyl - 3 - isobutyl)propyldiethyl-benzylammonium chloride*

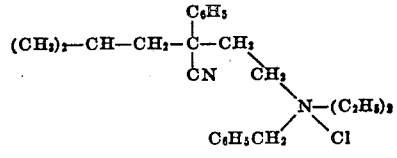

A mixture of 19.1 g. of phenylisobutyldiethylaminoethylacetonitrile, 9.9 g. of benzyl chloride and 75 ml. of ethyl acetate was heated on a steam bath for three hours. Then part of the ethyl acetate was evaporated and ether added whereupon a crystalline solid precipitated. This suspension was collected by filtration, and the resulting benzochloride of phenylisobutyldiethylaminoethylacetonitrile was recrystallized from a methanol-ether mixture giving 6.7 g., M. P. 162–164° C. (uncorrected).

(d) *(3 - cyano - 3 - phenyl - 3 - isobutyl)propyl-triethylammonium bromide*

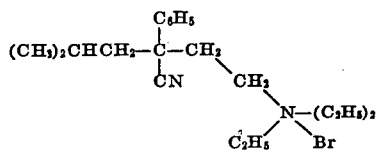

A mixture of 19.1 g. of the nitrile and 33 g. of ethyl bromide was heated at about 50° C. for ten days. The excess of ethyl bromide was evaporated and the residue was recrystallized from an acetone-ether mixture giving the ethobromide of phenylisobutyldiethylaminoethylacetonitrile, M. P. 135.5–137° C. (uncorr.).

EXAMPLE 4

(a) *Phenylisobutyldimethylaminoethylacetonitrile*

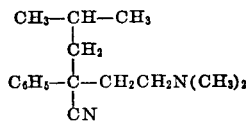

was prepared by a method similar to that described in Example 2, part (a). The reaction of 86.7 g. of phenylisobutylacetonitrile, 54 g. of dimethylaminoethyl chloride and 30 g. of sodium amide gave 71.6 g. of phenylisobutyldimethylaminoethylacetonitrile, B. P. 112–120° C. (0.4 mm.); $n_D^{25}=1.5020$.

Its hydrochloride had the M. P. 242–243° C.

Anal. calcd. for $C_{16}H_{25}N_2Cl$: C, 68.43; H, 8.97; Cl, 12.63. Found: C, 68.56; H, 9.07; Cl, 12.53.

(b) *(3 - cyano - 3 - phenyl - 3 - isobutyl)propyl-trimethylammonium iodide*

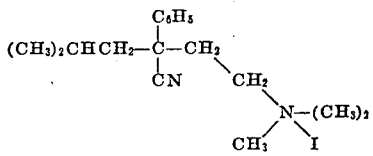

was prepared by heating phenylisobutyldimethyl-aminoethylacetonitrile with an excess of methyl iodide in benzene solution. It had the M. P. 150.5–152.5 °C.

Anal. calcd. for $C_{17}H_{27}N_2I$: N, 7.25; I, 32.85. Found: N, 7.14; I, 33.25.

EXAMPLE 5

(a) *Phenyl - (2 - methyl - 1 - propenyl) - (N-piperidylethyl)-acetonitrile*

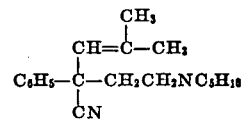

was prepared by a method similar to that described in Example 1, part (b). The reaction of 85.6 g. of isobutylidene-phenlyacetonitrile [Murray and Cloke, J. Am. Chem. Soc. 58, 2016 (1936)], 92 g. of piperidylethyl chloride hydrochloride and 50 g. of sodium amide gave 106 g. (75%) of phenyl - (2 - methyl - 1 - propenyl) - (N - piperidylethyl)-acetonitrile, B. P. 136–139° C. (0.05 mm.); $n_D^{25}=1.5260$.

Its hydrochloride had the M. P. 203–204.5° C.

Anal. calcd. for $C_{19}H_{27}N_2Cl$: N, 8.79; Cl, 11.12. Found: N, 8.60; Cl, 11.12.

(b) *[3 - cyano - 3 - phenyl - 3(2' - methyl-1'-propenyl)]propyl-methylpiperidinium iodide*

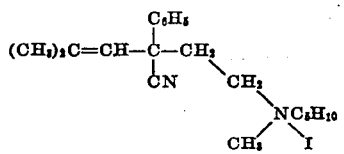

was prepared by heating phenyl-(2-methyl-1-propenyl) - (N - piperidylethyl) - acetonitrile with an excess of methyl iodide in benzene solution. It had the M. P. 199.5–201° C.

Anal. calcd. for $C_{20}H_{29}N_2I$: N, 6.60; I, 29.91. Found: N, 6.48; I, 29.85.

I claim:

1. A quaternary ammonium salt of the formula

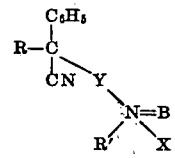

wherein R is a member of the group consisting of alkyl and alkenyl radicals of 4–6 carbon atoms and 5–6 membered cycloalkyl radicals, R' is a hydrocarbon group selected from the class consisting of lower alkyl and phenyl-lower alkyl radicals, Y is a lower alpha, beta-alkylene radical, —N=B is a member of the group consisting of dialkylamino, piperidino, pyrrolidino and morpholino, and X is a non-toxic anion.

2. A quaternary ammonium salt of the formula

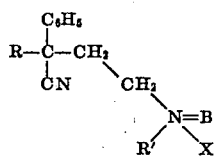

wherein R is a 5–6 membered cycloalkyl radical, —N=B is a dialkylamino group, R' is a lower alkyl group and X is a non-toxic anion.

3. A quaternary ammonium salt of the formula

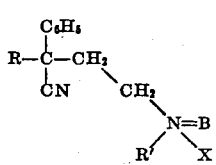

wherein R is a 5–6 membered cycloalkyl radical, N=B is a piperidino group, R' is a lower alkyl group and X is a non-toxic anion.

4. A quaternary ammonium salt of the formula

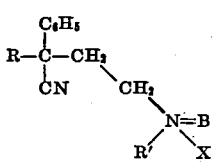

wherein R is an alkyl radical of 4–6 carbon atoms, N=B is a dialkylamino group, R' is a lower alkyl group and X is a non-toxic anion.

5. A quaternary ammonium salt of the formula

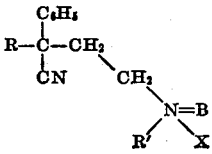

wherein R is an alkyl radical of 4–6 carbon atoms, N=B is a piperidino group, R' is a lower alkyl group and X is a non-toxic anion.

6. (3 - cyano - 3 - phenyl - 3 - isobutyl) propyl - methylpiperidinium iodide having the formula

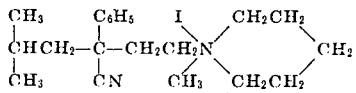

7. (3 - cyano - 3 - phenyl - 3 - isobutyl) propyl - diethylmethylammonium iodide having the formula

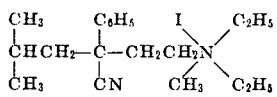

8. The process for preparing a quaternary ammonium salt of the formula

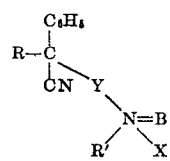

wherein R is a member of the group consisting of alkyl and alkenyl radicals of 4–6 carbon atoms and 5–6 membered cycloalkyl radicals, Y is a lower alpha,beta-alkylene radical, R' is a hydrocarbon group selected from the group consisting of lower alkyl and phenyl-lower alkyl radicals, —N=B is a member of the group consisting of dialkylamino, piperidino, pyrrolidino and morpholino, and X is a non-toxic anion; which comprises treating a nitrile of the formula

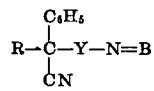

with a compound R'X in an inert organic solvent.

9. The process for preparing a quaternary ammonium salt of the formula

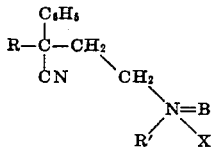

where R is an alkyl group of 4–6 carbon atoms, R' is a lower alkyl group, —N=B is a dialkylamino group and X is a non-toxic anion; which comprises treating a nitrile of the formula

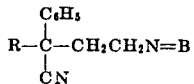

with a compound R'X in an inert organic solvent.

10. The process for preparing a quaternary ammonium salt of the formula

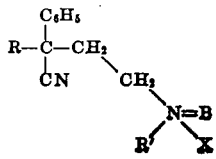

where R is an alkyl group of 4–6 carbon atoms, R' is a lower alkyl group, —N=B is a piperidino group and X is a non-toxic anion; which comprises treating a nitrile of the formula

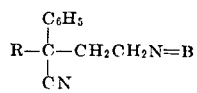

with a compound R'X in an inert organic solvent.

11. The process according to claim 9 where R is isobutyl.

12. The process according to claim 10 where R is isobutyl.

13. A quaternary ammonium salt of the formula

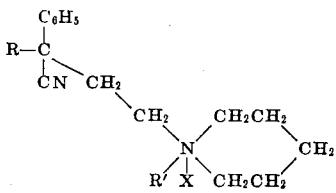

wherein R is an alkenyl radical of 4–6 carbon atoms, R' is a lower alkyl group and X is a non-toxic anion.

14. (3 - cyano - 3 - phenyl - 3 - cyclohexyl) propyl - diethylmethylammonium iodide having the formula

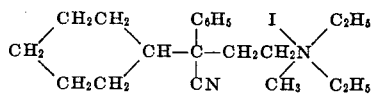

15. [3 - cyano - 3 - phenyl - 3 -(2' - methyl - 1' - propenyl)]propyl - methylpiperidinium iodide having the formula

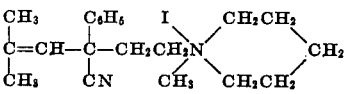

ARLO WAYNE RUDDY.

REFERENCES CITED

The following references are of record in the file of this patent:

UNITED STATES PATENTS

| Number | Name | Date |
| --- | --- | --- |
| 2,032,097 | Piggott et al. | Feb. 25, 1936 |
| 2,109,024 | Holzach et al. | Feb. 27, 1938 |
| 2,113,606 | Taub et al. | Apr. 12, 1938 |
| 2,405,555 | Bergel et al. | Aug. 13, 1946 |
| 2,446,804 | Bergel et al. | Aug. 10, 1948 |

FOREIGN PATENTS

| Number | Country | Date |
| --- | --- | --- |
| 728,241 | France | Dec. 14, 1931 |
| 884,569 | France | July 30, 1942 |

OTHER REFERENCES

Cohen et al., Jour. Chem. Soc. (London), vol. 107 (1915), pages 901 and 902.

Eisleb, Berichte Der Deu Chem., vol. 74B (1941), p. 1442.